(12) United States Patent
Welch

(10) Patent No.: US 8,075,231 B2
(45) Date of Patent: Dec. 13, 2011

(54) AIR RELEASE PNEUMATIC LOAD BINDER

(76) Inventor: Leon Wesley Welch, Orillia (CA)

( * ) Notice: Subject to any disclaimer, the term of this patent is extended or adjusted under 35 U.S.C. 154(b) by 128 days.

(21) Appl. No.: 12/656,142

(22) Filed: Jan. 19, 2010

(65) Prior Publication Data

US 2010/0266360 A1  Oct. 21, 2010

(51) Int. Cl.
  *B60P 7/08*  (2006.01)
(52) U.S. Cl. ......................... 410/100; 410/103
(58) Field of Classification Search ................ 410/12, 410/96, 97, 100, 103; 248/499; 24/68 CD, 24/68 CT, 265 CD; 254/93 VA, 228
See application file for complete search history.

(56) References Cited

U.S. PATENT DOCUMENTS

| | | |
|---|---|---|
| 1,435,128 A | 11/1922 | Newman |
| 1,455,224 A | 5/1923 | Paoli |
| 1,497,218 A | 6/1924 | McBride |
| 1,812,577 A | 6/1931 | Albertine |
| 1,903,887 A | 4/1933 | Widener |
| 1,920,285 A | 8/1933 | Wilkins et al. |
| 1,964,003 A | 6/1934 | McBride |
| 2,010,679 A | 8/1935 | Rosenberry et al. |
| 2,249,078 A | 7/1941 | Fox |
| 2,383,061 A | 8/1945 | Johnson |
| 2,620,160 A | 12/1952 | Ray |
| 2,773,700 A | 12/1956 | Lasswell |
| 2,907,600 A | 10/1959 | Lowery |
| 3,150,859 A | 9/1964 | Payne |
| 3,298,663 A | 1/1967 | Hextell |
| 3,395,932 A | 8/1968 | Meyers |
| 3,608,864 A | 9/1971 | Dargitz et al. |
| 3,662,994 A | 5/1972 | Johns |
| 3,891,187 A | 6/1975 | Bearden, Jr. |
| 3,998,167 A | 12/1976 | Van Gompel |
| 4,004,777 A | 1/1977 | Despas |
| 4,036,476 A | 7/1977 | Douce et al. |
| 4,223,869 A | 9/1980 | Patterson, III et al. |
| 4,540,159 A | 9/1985 | Jordan |
| 4,706,343 A | 11/1987 | Neidigk |
| 2007/0048103 A1* | 3/2007 | Williams et al. ............. 410/100 |

* cited by examiner

*Primary Examiner* — Stephen Gordon
(74) *Attorney, Agent, or Firm* — Defillo & Associates, Inc.; Evelyn A Defillo

(57) ABSTRACT

A mechanically actuated, air release, binding device adapted for use on trucks or trailers, commonly known as a load binder, comprises a horizontally aligned frame, truck air brake cylinder, lever arm and attachment connection. The air brake includes an internal piston and exposed drive shaft which are spring driven outwards from the cylinder. Application of compressed air to the cylinder drives the piston and drive shaft inwards, rotating the lever arm and providing a fully slack condition in binding straps or chains attached to the binder. Release of all or part of the cylinder compressed air draws in upon the lever arm rotating it to a full or floating binding condition automatically. A ratchet and pawl secured to the lever arm mechanically locks the binder and adjusts when the binder becomes slack due to load shift or transportation conditions. The pawl is fully released to permit the binder to provide full load strap slack for attachment or removal.

18 Claims, 5 Drawing Sheets

AIR RELEASE PNEUMATIC LOAD BINDER

PRIOR ART AND BACKGROUND

The variety of conditions associated with shipping heavy loads by truck or flat-bed trailer has resulted in an industry practise of the use of multiple individual load binders for each loaded item. These binders are commonly chains or belts which are attached to the truck or trailer bed at one or both ends with the opposite end secured and tightened in place to secure the load.

Variations in chains and belts plus the variety of load shapes, sizes and tie down requirements necessitate as many as 18 or more individual load binders used on a single shipment. Each of these must be securely fastened to the correct tension by the driver and then monitored in the event that the load might shift during transport. Variations in loading as a result of transport make disassembly of the load binders not only difficult but more dangerous than the original assembly and lock down. Adverse conditions and working requirements make the assembly and removal treacherous, particularly from the top of the load. This is particularly so in modern just-in-time conditions where transport time, arrival time and time at the dock unloading are all critical elements for the trucker, the shipper and the recipient.

In each case the strap or chain is normally manually tightened and then secured by an over-center lever or pawl latch. These require considerable force applied by lever arms which have a long stroke. Arranging and securing the binder requires the driver to climb up and over the load several times while working the lever arm in awkward positions. As a result of these multiple locations and the variety of shipping conditions, there is no common automated mechanism to achieve this task. The trucker, the shipment and the customer remain subject to delays and risk.

There are 2 types of trailer beds in common use. In the 1st, the bed is perforated along its long edges with holes adapted to receive load restraining posts and chain or strap attachment ends. In this case, if straps are used, these straps can pass over the trailer edge for securement about a rotating spool which is driven automatically or manually and restrained by a latching pawl. In the 2nd, the trailer bed has attached loops which engage side posts and a surrounding protective strapping. This provides a continuous spacing and rail for chain or strap attachment.

Also in common use are air brakes wherein the work is provided by an industry standard 'maxi' air pot braking device referred to herein as a pneumatic cylinder. These pneumatic cylinders work in reverse. The internal piston is driven into the pot by a very strong spring (with as much as 50 tons force). This motion closes the brakes towards a fully stopped position. Compressed air is applied to the cylinder chamber and relieves against the spring pressure to drive the piston outward. With air brakes this compressed air progressively releases the truck braking thereby permitting movement. Conversely, release of the air pressure, or failure of the air system entirely, causes braking by allowing the spring to drive the piston inwards and apply a portion or all of the spring pressure to the brakes. By this it is only with the compressed air pressure in operation that the brakes are released and the truck becomes mobile.

Use of the automatic and/or pneumatic load binders saves time and money in the competitive shipping business where customer requirements and 'just-in-time' inventory needs dictate minimum time at the loading dock at just the right moment. This in turn further allows the trucker to increase the number of loads, lower the work requirements per load and greatly increase the safety of the transport both on the loading dock and during transportation. Fewer inspections of binder conditions are required and the trucker can avoid many of the impacts of adverse driving conditions in all kinds of climates.

Examples of prior art binders of the wind-up variety are shown in Williams US published pending application 2007/0048103 published Mar. 1, 2007 and Leggett US published pending application 2007/0269285 published Nov. 22, 2007 both with a ratchet lock.

An example of a direct drive binder is shown in Lasswell U.S. Pat. No. 2,773,700 issued Dec. 11, 1956. This is dependent on maintenance of the hydraulic pressure and motor-pump.

Attempts at pressure relieved spring driven binders are found in Meyers U.S. Pat. No. 3,395,932 issued Aug. 6, 1968, Grau U.S. Pat. No. 3,924,544 issued Dec. 9, 1975 and Neidigk U.S. Pat. No. 4,706,343 issued Nov. 17, 1987. These demonstrate a long and sporadic development period of more than 30 years without success or known practical result beyond rotating spool binders mounted below the trailer bed.

Grau provides a spring loaded binder extending vertically through the load bed in a central location. The stroke is very limited and the binding effect is only operative for a direct vertical connection to a single load item.

Neidigk describes a multi-unit or load independent binder providing spring pressure holding. As far as can be seen from the disclosure the device is independent of the truck and an extra part used, if at all, in a fully exposed position above the bed. No satisfactory lock mechanism is disclosed.

Meyer discloses a binder with air release and spring load. In operation as far as can be understood, Meyer is vertically oriented and completely above the load bed. This requires both a retracted load position and a plurality of specialty parts and mechanisms. Stroking is limited, disclosing a cinder suitable under limited conditions for loads and tie-downs with fixed dimensions and little or no variability. As a result, the load is restricted to an apparently unstable elevated position secured against forward and rotary movement and the Meyers binder is not know to operable in conventional, non-load-specific situations and would be difficult and expensive to manufacture with little utility in long term general use.

The primary binders in use are mechanical wind-up devices mounted below the load bed with or without automatic operation with little or no provision for safe full time binding or quick and safe installation, use or removal.

None of the direct drive or relieved spring prior art devices are known to have reached any substantial commercial use likely due to the to the limited stroke provided by the highly exposed vertical orientation and complex load and use specific structures shown. None of the prior art items provide a simple structure which may be attached and used safely in a multiplicity of locations in both existing and new installations by relatively untrained operatives.

OBJECTS OF THE INVENTION

It is an object of the invention to utilize industry standard parts, such as the 'maxi' air pot, to drive a simple assembly completely contained underneath the trailer bed which can be readily and manually attached to either load binder chains or belts for use with a wide variety of loads in variable conditions.

It is a further object to utilize truck compressed air to drive a piston out and release or slacken the tension in the chain/belt and/or position the lever arm for connection while providing for direct mechanical linkage pressure to accomplish and maintain the binding of the load.

It is a further object to automatically draw down on the lever arm and thus tension the load binder mechanically once the cylinder air is released thereby allowing the spring pressure to bind the load. During transport any load shifting resulting in lower tension (slackness) in the binder would be automatically taken up.

It is a further object of the invention to provide an assembly generally horizontally aligned and positioned below the truck bed so as to provide for a secure connection through existing holes or spacings requiring no alterations to the truck itself for installation or use and while providing full hidden protection within the truck or trailer body in use and when any repairs may be required.

It is another object to provide an optional pressure relief valve to permit the user to retain a portion of the compressed air in the pot and thus resist the full impact of the heavy spring tension white providing an adjustable tension.

It is an object to provide a automatic and pneumatic load binder which is simple and inexpensive to manufacture and install and which requires little or no training or practise to use effectively.

SUMMARY OF THE INVENTION

The invention provides a simple automatic and lockable air release pneumatic load binder which is assembled from standard truck parts and easily fabricated arms and mounts. Product cost and development time is minimized as no adaptations to complex hydraulic or pneumatic drivers are required. Fabrication and repairs can be accomplished in the field without specialty tools or equipment.

The invention provides an automatic load binder for trucking comprising means to secure said binder below a truck load bed, drive means including piston and shaft means having a load binding position and a slack position, spring means adapted to drive the piston and shaft means towards a binding position, and compressed air means opposing said spring and means adapted to drive the piston and shaft towards a slack position, lever means operatively mounted to the securing means and driven by the piston and shaft means for rotation about a horizontal axis, and connection means adapted to bind the lever to a load binding position under pressure from said spring means.

The invention further provides a load binder with spring means adapted to drive the piston and shaft means in a generally horizontal direction perpendicular to the horizontal axis secured inboard of the lever means.

The invention further provides a load binder wherein the drive means includes a pneumatic cylinder and said piston means is spring driven to extend said shaft outwards of said cylinder lengthwise of the direction of travel.

The invention also provides a load binder wherein the compressed air is supplied internally to the drive cylinder and compels the piston and means to retract into the drive cylinder against said spring means.

The invention further provides a trucking load bed including a plurality of load binders and a plurality of binding straps or chains secured between a respective lever, through the load bed adapted to secure a load to said load bed.

DESCRIPTION OF THE PREFERRED EMBODIMENTS

Figure 1:
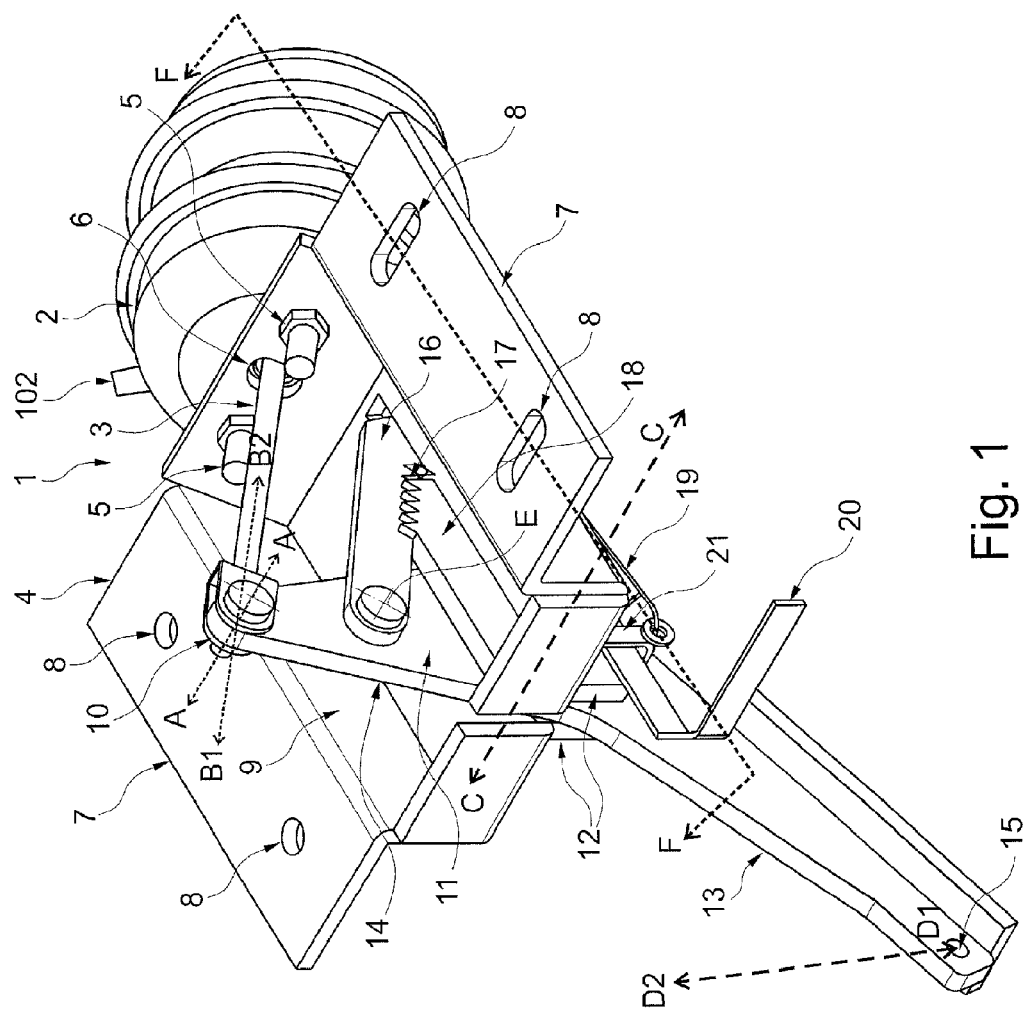
FIG. 1 is a perspective view of the mechanically actuated, air release, pneumatic load binder of the invention in the fully extended binding position.
Figure 2:
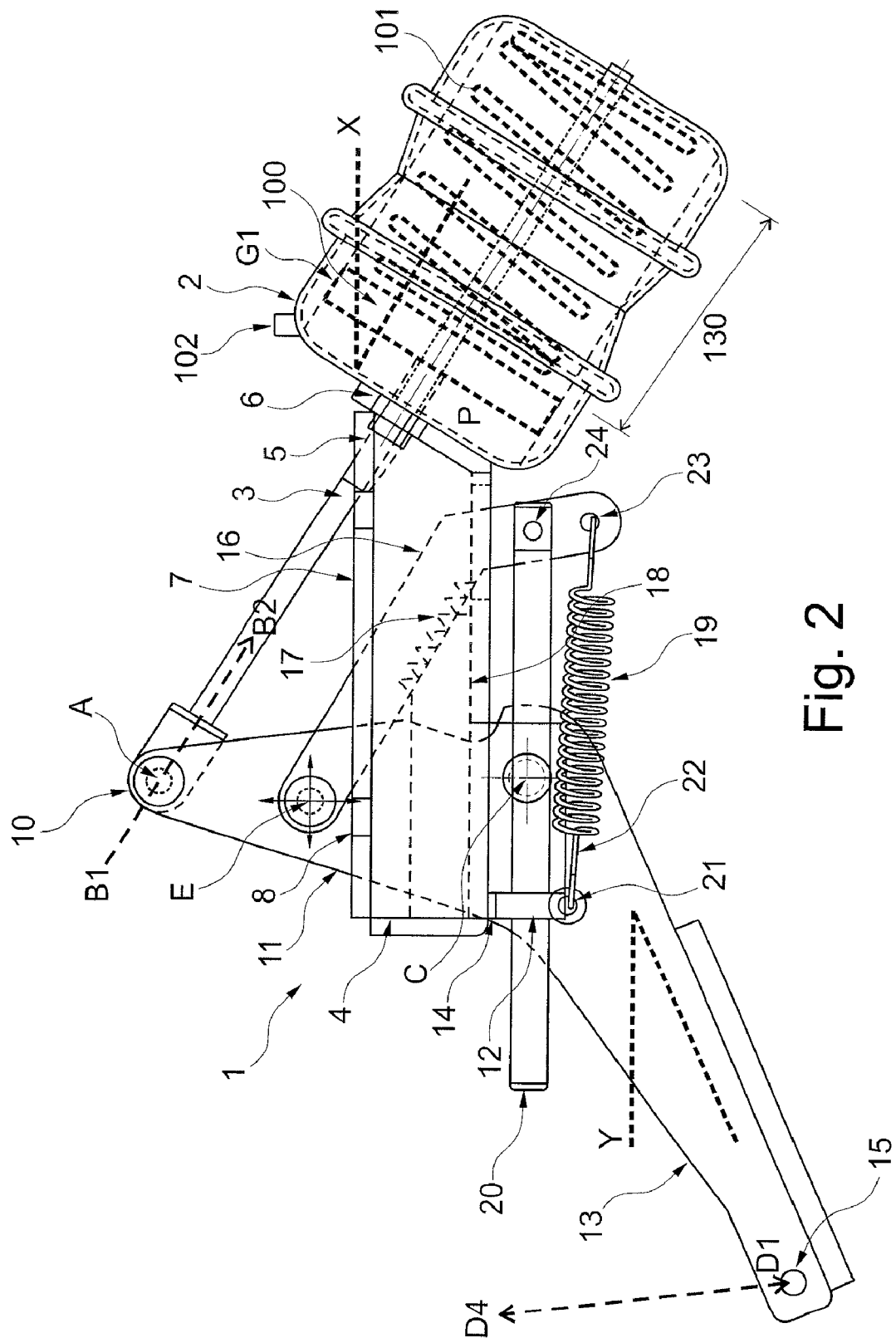
FIG. 2 is a plan view of the load binder of FIG. 1.

The mechanically actuated, air release, pneumatic load binding system of the invention 1 is shown in perspective view in FIG. 1 and in elevation in FIG. 2.

A commercially available pneumatic truck air brake cylinder commonly known as a 'maxi-pot' 2 is secured to load binder frame 4 as by bolts 5 with elongated drive shaft 3 extending into frame 4 as by orifice 6. Cylinder 2 contains a piston 100 (FIG. 2) which is driven outwards by spring 101 so as to compel drive shaft 3 with a strong force into a rest fully binding position D1, fully extended from cylinder 2, commonly several tons. Compressed air is introduced into cylinder 2 directly from the truck or trailer braking system as at air inlet 102 so as to drive shaft 3 inwards of the cylinder 2 along line B in FIG. 1 from rest binding position B1 towards slack position B2. Preferably cylinder 2 has a short-stroke 103 and a strong spring-return force. The whole of cylinder 2 and shaft 3 are generally horizontally disposed with cylinder 2 inboard of truck load bed 29.

Shaft 3 is pivotally secured at its distal end 10 to a lever arm 14 for rotation about axis A.

Lever arm 14 is rotatably secured to generally horizontal frame structure 4 at depending tabs 12 for clockwise rotation about a fulcrum axis C. Lever arm 14 comprises a short arm 11 and a relatively longer load bearing arm 13. Upon rotation of lever arm 14 clockwise about axis C, as compelled by drive shaft 3 withdrawing into cylinder 2 under the force of air pressure P1, load bearing arm 13 is driven from binding or rest position D1 upward along line D to a slack position D4. Similarly, upon release of some or all of the supplied air pressure by opening valve 33 to atmosphere, drive shaft 3 is extended by internal spring pressure thereby rotating lever arm 14 counterclockwise about axis C and drawing down on arm 13 from slack position D2 to binding position D1. As can be seen, the final binding position is determined by a balance between the load applied to arm 13 at connection 15 and the spring force applied to arm 11 through drive shaft 3. Complete release of air pressure P from cylinder 2 to atmosphere, as is usual in truck braking, results in the maximum load of the spring pressure being applied to the lever arm 14. Partial release of air pressure P will apply a partial load to lever arm 14 as the spring pressure is balanced by the compressed air P remaining in cylinder 2.

Frame 4 fully encloses parts cavity 9 when binder 1 is secured beneath or within a truck or trailer flat bed by bolts (not shown) through bolt holes 8 in flanges 7 with cylinder 2 inboard.

Pawl 16 is pivotally secured to lever arm 14, preferably a short arm 11 within parts cavity 9 to releasably interlock with fixed ratchet 18 along matching teeth 17. Ratchet 18 mechanically secures the position of lever arm 14 at its final load position and prevents clockwise rotation of lever arm 14 should the truck load shift so as to apply more load to arm 13 at connection 15. Preferably, ratchet 18 also allows further counterclockwise rotation of load arm 13 should motion of the truck load cause a reduced load to arm 13 at connection 15, thus automaticity tightening and restraining load binder 1.

Figure 3:
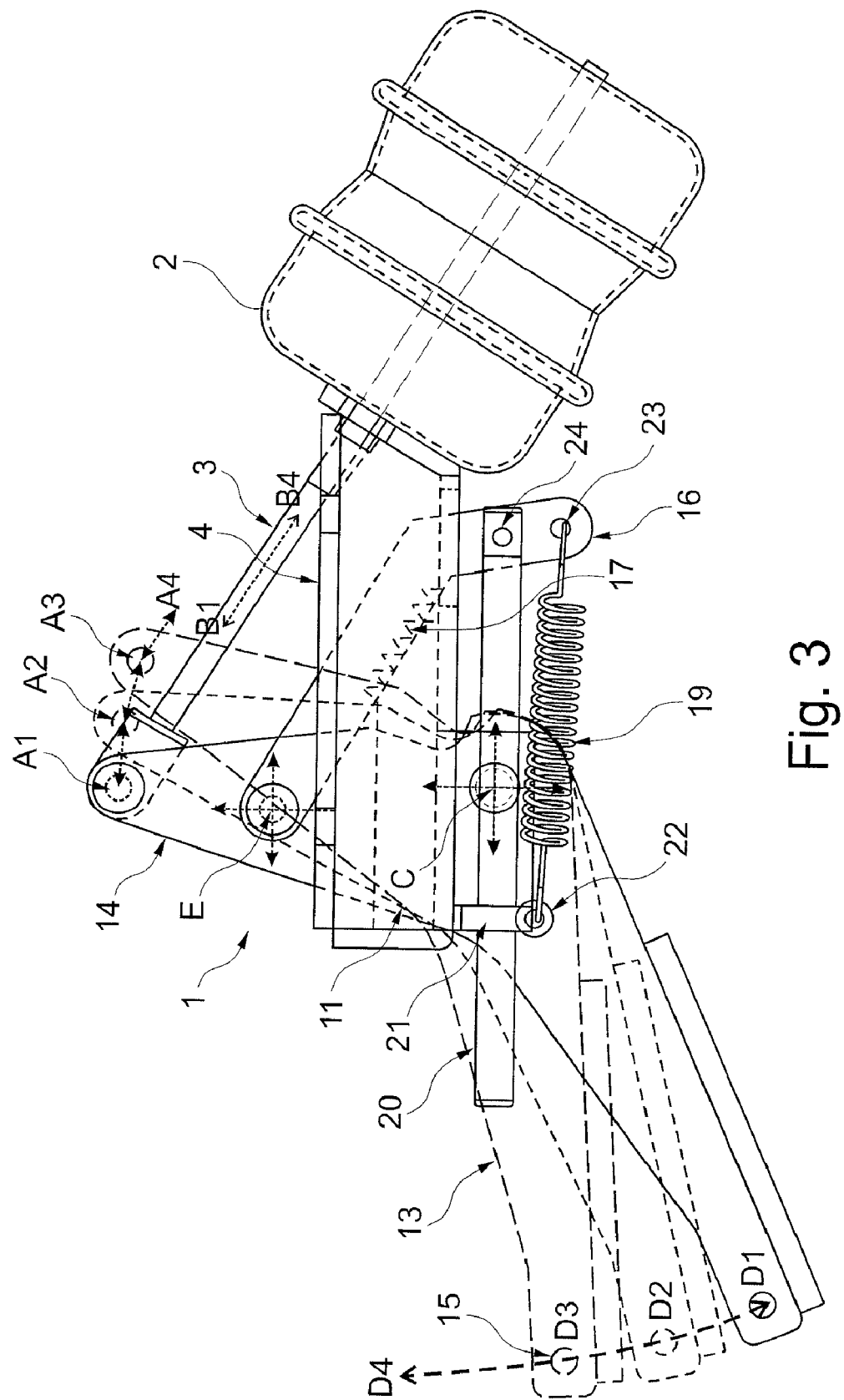
FIG. 3 is a plan view of the load binder of FIG. 2 depicted various positions of the binder.

Preferably, as shown in FIG. 3 lever arm 14 and axis C forms a horizontally disposed 1st class lever with short arm 11 substantially shorter than load bearing arm 13. The mechanical advantage of the lever 14 exchanges the low-motion (A1 to A4 and B1 to B4) high-spring-pressure of the typical truck brake cylinder for the respectively higher motion (D1 through D4) of connection 15 and chain 31 (FIG. 8) required for both automatic load adjustment and full release upon slackening from a full binding position D1 through floating binding positions D2 and D3 to a fully slack position at D4.

As shown in FIGS. 1 through 3 and 8 the load binder 1 of the invention is substantially horizontally aligned with the sensitive moving parts cased in frame 4 and well inboard of the truck or flat bed trailer edge 34. Preferably cylinder 2 operates at a fixed angle X (FIG. 8) to the truck bed while load arm operates between a horizontal slack position D3 and D4 (FIG. 3) and a downward angle Y when fully engaging the truck load as at D1 (FIG. 3)

Pawl 16 is maintained in its clockwise position of FIG. 1 by spring 19 secured to frame 4 at channel 21. Release lever 20 is secured to pawl 16 and permits manual disengagement of ratchet 18 by counterclockwise rotation of pawl 16 about axis E and separation of ratchet 18 when the load binder is released by application of air pressure.

FIG. 2 is a plan view of a cross-section of the load binder taken along line F-F in FIG. 1. Spring 19 is secured between attachment 22 at channel 21 and point 23 on pawl 17 thus compelling pawl 16 in a clockwise rotation about axis E in releaseable engagement with ratchet 18. Release lever 20 is slidably engaged in channel 21 and secured to pawl 16 as at 24 in FIG. 22. As arm 14 rotates counterclockwise about axis C under the spring force from drive shaft 3 ratchet 18 engages the progressive teeth 17 on pawl 16 and mechanically prevents the return counterclockwise rotation of arm 14. The same occurs should the load shift during transit thereby decreasing the load on arm 13 and permitting further counterclockwise rotation of lever arm 14 under the spring force of shaft 3 and re-engagement of progressive teeth 17 between ratchet 18 and pawl 16. Sliding release lever 20 in channel 21 causes counterclockwise rotation of pawl 16 about axis E and thus release of ratchet 17. As a matter of mechanical safety, release of pawl 16 from ratchet 17 may occur only when air driven or mechanical force rotates pawl 16 slightly to as to relieve locking pressure on teeth 17.

FIG. 3 shows a plan view as in FIG. 2 wherein shaft 3 is fully extended as at A1 rotating arm 14 to its full load bearing position D1 for binding of the load and transport. Application of air pressure to counter spring force in cylinder 2 draws in on shaft 3 and rotates lever arm 14 towards positions A2, A3 and A4. This rotation of lever arm 14 raises connection 15 from the full bind position D1 to partial (reduced load binding pressure) bind position D2 and reduced bind position D3 to a fully slack position D4.

Figure 8:
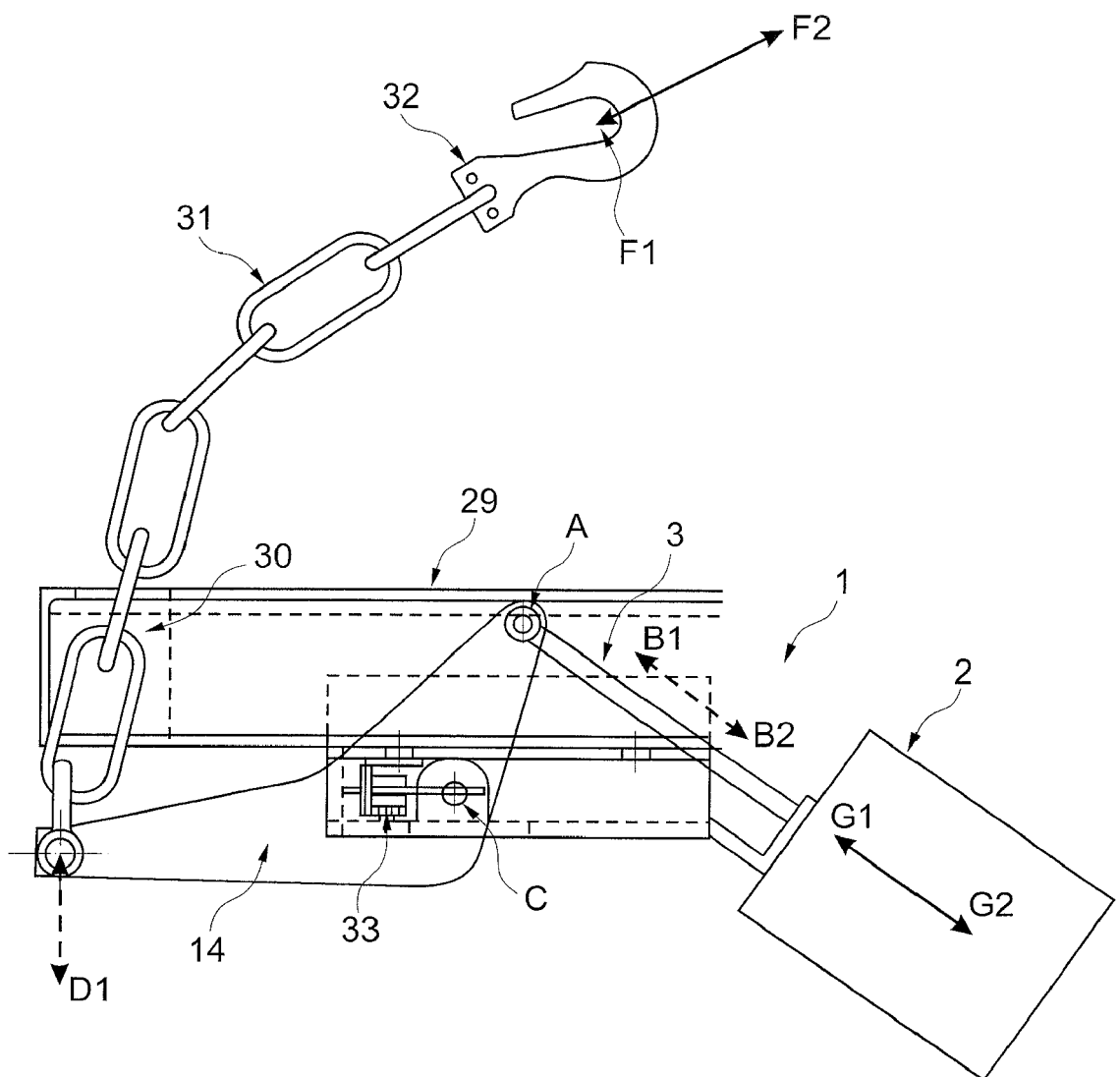
FIG. 8 is a diagramatic plan view of the load binder of FIG. 1 secured to a flat truck bed.

FIG. 8 is a diagramatic view of the load binder 1 secured beneath a truck or trailer bed 29 with connection 15 aligned with the periphery 34 of trailer bed 29. Typical truck beds 29 include a binding passage 30. Binder 1 is perpendicularly secured vertically to a load chain or strap 31 at connection 15 by means of a shackle 25. Chain 31 is preferably joined to a hook element 32 for continued attachment with suitable load binding straps (not shown) and-or directly to the load. As can be seen, expansion of the spring internal to cylinder 2 along line of force G2 to G1 extends drive shaft 3 along line B2 to B1 thereby rotating lever arm 14 counterclockwise and drawing down on connection 15 along direction D1. The levered force of the internal spring similarly draws down on chain 31 by shackle 25 and this force is continued through hook 32 as hook 32 is drawn down along line F-F from slack position F2 to binding position F1. Conversely, application of air pressure to cylinder 2 overcomes the extension of drive shaft 3 and rotates lever arm 14 clockwise and releases chain 31 and hook 32 from load position F1 to fully slack position F2 so that the binder may be quickly and safely removed from the load.

Figure 4:
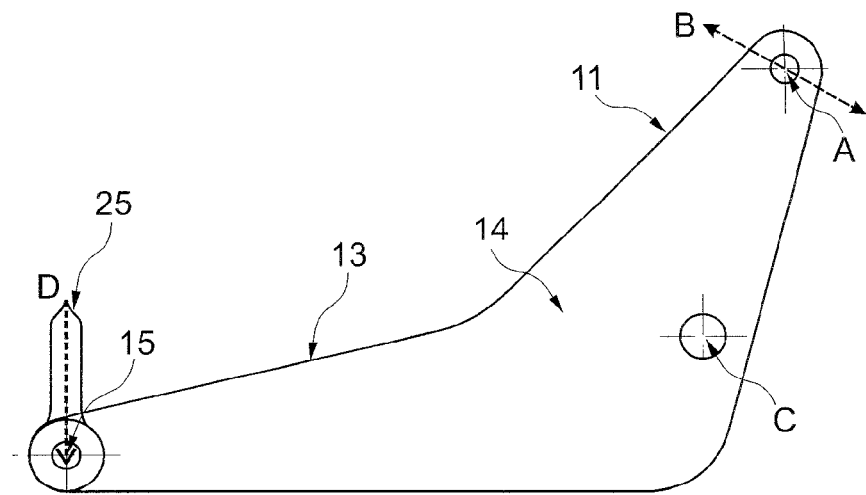
FIGS. 4 and 5 are a plan view and a top view respectively of a $2^{nd}$ embodiment the load binder lever arm.
Figure 5:
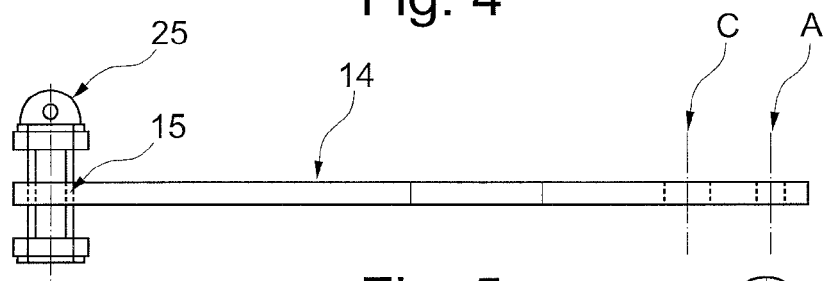

FIGS. 4 and 5 depict a flat plate embodiment of the lever arm 14 in plan and top view with shackle 25 attached at connection 15 as shown in FIG. 8.

Figure 6:
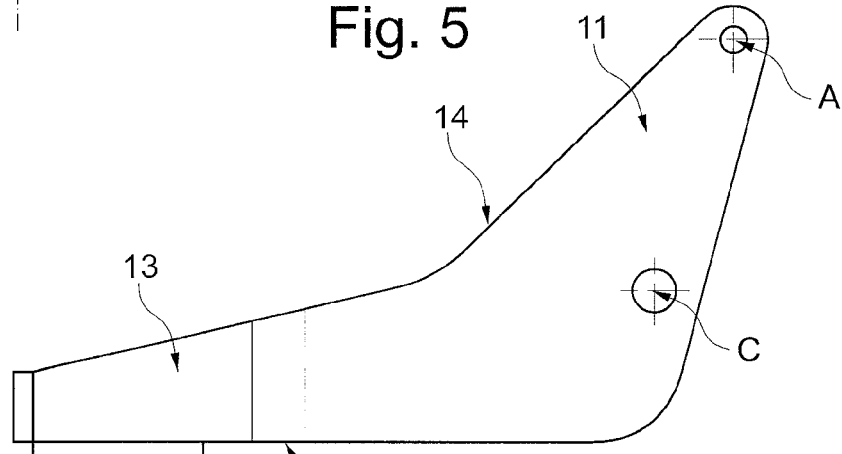
FIGS. 6 and 7 are a plan view and a top view respectively of a $3^{rd}$ embodiment of the load binder lever arm.
Figure 7:
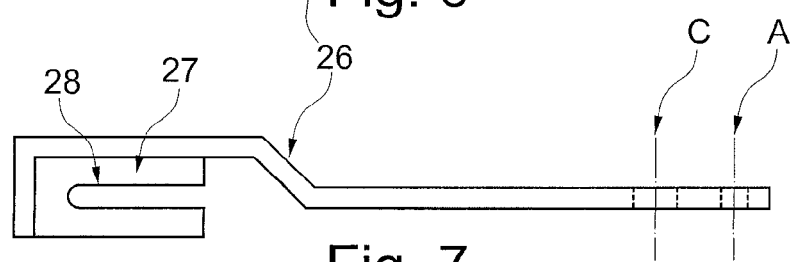

FIGS. 6 and 7 depict a further embodiment of lever arm 14 in plan and top view wherein a bend at 26 provides for alignment of connection slot 28 in tab 27 with the main axis of arm 14. In this embodiment the chain 31 of FIG. 8 may be directly and removable secured to arm 14 for an adjustable length by engaging an individual link with slot 28.

Preferably frame 4 contains air pressure valve and assembly 33 which applies and relieves truck air pressure directly to the interior of cylinder 2 under operator control in opposition to strong spring force along line G in FIG. 8 from G1 towards G2 in known manner.

While there has been shown and described what are considered to be preferred embodiments of the present invention, it will be apparent to those skilled in the art that various changes and modifications may be made therein without departing from the invention as defined in the appended claims.

What I claim is:

1. An automatic load binder for trucking comprising:
    (a) means to secure said binder below a truck load bed,
    (b) drive means including:
        i. piston and shaft means having a load binding position and a stack position,
        ii. spring means adapted to drive said piston and shaft means towards said binding position, and
        iii. compressed air means opposing said spring means and adapted to drive said piston and shaft means towards said stack position,
    (c) lever means operatively mounted to said means for securing and driven by said piston and shaft means for rotation about a horizontal axis,
    (d) connection means adapted to bind said lever means to a load in said binding position under pressure from said spring means.

2. A load binder as claimed in claim 1 wherein said drive means and said lever means are secured in a generally horizontal orientation.

3. A load binder as claimed in claim 2 wherein said spring means is adapted to drive said piston and shaft means in a generally horizontal direction perpendicular to said horizontal axis.

4. A load binder as claimed in claim 3 wherein said drive means is further adapted to be secured inboard of the said lever means.

5. A load binder as claimed in claim 4 wherein said drive means includes a pneumatic cylinder and said piston means is spring driven to extend said shaft means outwards of said cylinder.

6. A load binder as claimed in claim 5 wherein said horizontal axis is adapted to be aligned lengthwise of a direction of travel.

7. A load binder as claimed in claim 6 wherein said spring means is internal to said drive means.

8. A load binder as claimed in claim 7 wherein said compressed air means includes means to selectively supply compressed air internally to said drive means adapted to compel said piston and shaft means to retract into said drive means against said spring means.

9. A load binder as claimed in claim 8 further comprises means to secure a binding strap or chain substantially vertical and perpendicular to said lever.

10. A load binder as claimed in claim 9 wherein said cylinder comprises a truck air brake cylinder.

11. A load binder as claimed in claim 10 wherein said compressed air means includes valve means adapted to alternatively provide compressed air to said cylinder and to relieve compressed cylinder air toward the atmosphere.

12. A load binder as claimed in claim 11 wherein said valve means is adapted to fully relieve compressed cylinder air to the atmosphere and rotate said lever means upwards to said slack position.

13. A load binder as claimed in claim 11 wherein said value means is adapted to selectively partially relieve compressed cylinder air and partially rotate said lever means into a floating binding position.

14. A load binder as claimed in claim 12 or 13 further including ratchet means adapted to secure said lever means in a binding position.

15. A load binder as claimed in claim 12 or 13 further including ratchet means adapted to secure said lever means in a plurality of binding positions.

16. A load binder as claimed in claim 15 wherein said ratchet means is selectively releaseable from said lever means.

17. A trucking load bed including:
  (a) a plurality of load binders each as claimed in claims 1 through 13,
  (b) a plurality of binding means secured between a respective said lever means and said load bed adapted to secure a load to said load bed.

18. A trucking load bed as claimed in claim 17 wherein said binding means are adapted to extend through said load bed to engage said lever means.

* * * * *